(12) United States Patent
Washington, III et al.

(10) Patent No.: US 6,980,096 B1
(45) Date of Patent: Dec. 27, 2005

(54) TRAILER HITCH SAFETY SYSTEM

(76) Inventors: Charles Fred Washington, III, 106 Secluded Oaks, Kerrville, TX (US) 77028; Rainer Kuenzel, P.O. Box 824, Hunt, TX (US) 77024

( * ) Notice: Subject to any disclaimer, the term of this patent is extended or adjusted under 35 U.S.C. 154(b) by 0 days.

(21) Appl. No.: 11/160,082

(22) Filed: Jun. 8, 2005

(51) Int. Cl.[7] .............................................. G08B 21/00
(52) U.S. Cl. ..................... 340/431; 340/686.4; 340/687
(58) Field of Search ................................ 340/431, 687, 340/686.2, 686.4

(56) References Cited

U.S. PATENT DOCUMENTS

| | | | | |
|---|---|---|---|---|
| 4,127,855 A | 11/1978 | Toner | ........................... | 340/687 |
| 4,271,401 A | 6/1981 | Meo | ........................... | 340/52 D |
| 4,593,264 A | 6/1986 | Engle | ........................ | 340/52 R |
| 4,627,633 A * | 12/1986 | Gehman et al. | ............ | 280/432 |
| 4,852,901 A | 8/1989 | Beasley et al. | ............. | 280/477 |
| 4,854,604 A | 8/1989 | Stallsworth | .................. | 280/477 |
| 5,159,312 A * | 10/1992 | Engle | .......................... | 340/431 |
| 5,421,600 A * | 6/1995 | Jones et al. | ................. | 280/428 |
| 5,434,552 A * | 7/1995 | Ems | ........................... | 340/431 |
| 6,222,443 B1 | 4/2001 | Beeson et al. | ............. | 340/431 |
| 6,788,190 B2 | 9/2004 | Bishop | ....................... | 340/435 |
| 6,889,995 B2 * | 5/2005 | Staggs | ........................ | 280/507 |

* cited by examiner

Primary Examiner—Daryl C Pope
(74) Attorney, Agent, or Firm—Law Office of Tim Cook P.C (57) ABSTRACT

A hitch mechanism comprises an interlocking safety pin and a sleeve or other mechanism which, in a locking position, exposes a hole which is adapted to receive the safety pin. The safety pin includes an interlock to activate either an audible alarm, a visible alarm, of both. In alternative embodiment, the pin mechanism further includes means to foil a would-be thief in uncoupling the towed vehicle. In a further alternative embodiment, the safety pin includes an internal power supply to eliminate certain wired connections.

12 Claims, 7 Drawing Sheets

TRAILER HITCH SAFETY SYSTEM

FIELD OF THE INVENTION

The present invention relates generally to the field of hitches used on vehicles and, more particularly, to a trailer hitch that assures that the towed vehicle cannot become disengaged from the hitch during travel. Even more particularly, the present invention reminds the user to install a safety pin to the hitch before moving the towing and towed vehicle.

BACKGROUND OF THE INVENTION

Devices are known in the prior art which provide an alarm signal when a trailer becomes uncoupled from a trailer hitch. Certain prior art devices include those which have a mechanical switch that is actuated by the trailer when the trailer releases from the hitch. These kinds of devices typically have a switch actuating arm disposed above the ball of a conventional ball-type hitch. If the trailer becomes uncoupled from the ball, the tongue of the trailer which is secured to the hitch flies upward actuating the switch and causing an alarm signal in the vehicle operator compartment.

A trailer hitch monitor device which was adapted for use on a conventional ball-type hitch was shown and described in U.S. Pat. No. 4,127,855 to Toner. Toner provided an electrical circuit for monitoring the connection between a trailer and a trailer hitch. An electrical conductor was connected to the tongue of the trailer and the trailer hitch was grounded. A visual indicator was provided in series between the electrical conductor and a power source to provide an indication of trailer coupling as long as electrical continuity was maintained by the connection of the trailer to the hitch. An audible warning device and switch were in parallel with the visual indicator to provide a warning when electrical continuity was broken.

Unfortunately, this system relied on the use of a solid, conventional ball-type hitch, and consequently all of the electrical portion of the system had to be mounted on the trailer, i.e. the towed vehicle. Thus, the alarm portion of the system was also provided on the towed vehicle, severely limiting the usefulness of such a system.

Meo described a similar type of system in U.S. Pat. No. 4,271,401. This system included a safety trailer hitch with a mechanical connection to connect a trailer to a tow vehicle. Connection was made with the mechanical connection secured by a latch. A backup connection between the trailer and the tow vehicle was releasably secured to the tow vehicle. A first, normally open switch was positioned to be closed when the mechanical connection was made and a second, normally closed switch was positioned to be opened when the latch was closed. A third, normally closed switch was positioned to be opened when the backup connection was secured to the tow vehicle, with the second and third switches in parallel and in series with the first switch. The system further includes an alarm and a source of electric energy in an electric circuit with the switches such that when the first switch and either of the second or third switches were closed, the alarm was actuated. However, as with Toner, the operable portions of the system of Moe had to be mounted to the towed vehicle, substantially limiting the usefulness of the system.

This drawback in the art was addressed by Engle in U.S. Pat. No. 4,593,264. Engle provided a dual trailer hitch warning system for use with a ball and socket trailer hitch. The warning system included an electrically operated alarm system for signaling a loose coupling of the socket member on the ball member. A switch was mounted within the ball member which energized an alarm relay circuit when the ball switch operated due to a loose coupling to complete an alarm circuit between the automobile battery and the horn. The warning system also included a tampering relay circuit adapted to provide an alarm signal if an attempt was made to disengage or short out the alarm circuit or if the socket and ball member were deliberately uncoupled.

Although the Engle system was adapted to provide the electrical alarm portion on the towing vehicle, it still presented a number of drawbacks, including the fact that no means was provided for securely pinning the hitch to the ball, with an alarm means activated by improper pinning of the hitch to the ball. The present invention is directed to solving these and other limitations in the art.

SUMMARY OF THE INVENTION

The present invention addresses these and other needs in the art by providing an audible or visible alarm when the pin is not properly engaged. The present invention provides assurance that a hitch locking device of a trailer hitch securely engages the hitch ball and cannot slip off during travel. The invention makes it impossible to just set the trailer coupler down on the hitch ball and forget to engage the coupler locking device. This can easily happen if an operator is distracted during the operation of hitching a trailer to a towing vehicle.

A known trailer hitch typically has a pin which is supposed to be deposited in a hole behind or through the coupler lock, but if an operator fails to do so, there is commonly no warning mechanism in the prior art, because the prior art pins are simply pins with some sort of detent and with a chain or cable attachment to the trailer coupler. The present invention provides a safety pin that triggers an audible and/or visible alarm when it is not installed in its intended place.

The hitch mechanism of the present invention comprises a movable sleeve or other mechanism which, in a locking position, exposes a hole which is adapted to receive a safety pin. The safety pin includes an interlock to activate either an audible alarm, a visible alarm, of both. In alternative embodiment, the pin mechanism further includes means to foil a would-be thief in uncoupling the towed vehicle. In a further alternative embodiment, the safety pin includes an internal power supply to eliminate certain wired connections.

Other features and advantages of the present invention will be readily apparent to those of skill in the art from a review of the following detailed description along with the accompanying drawing figures.

BRIEF DESCRIPTION OF THE DRAWINGS

So that the manner in which the above recited features, objects, and advantages of the present invention are attained and can be understood in detail, more particular description of the invention, briefly summarized above, may be had by reference to embodiments thereof illustrated in the attached drawing figures.

DETAILED DESCRIPTION OF A PREFERRED EMBODIMENTS

Figure 1:
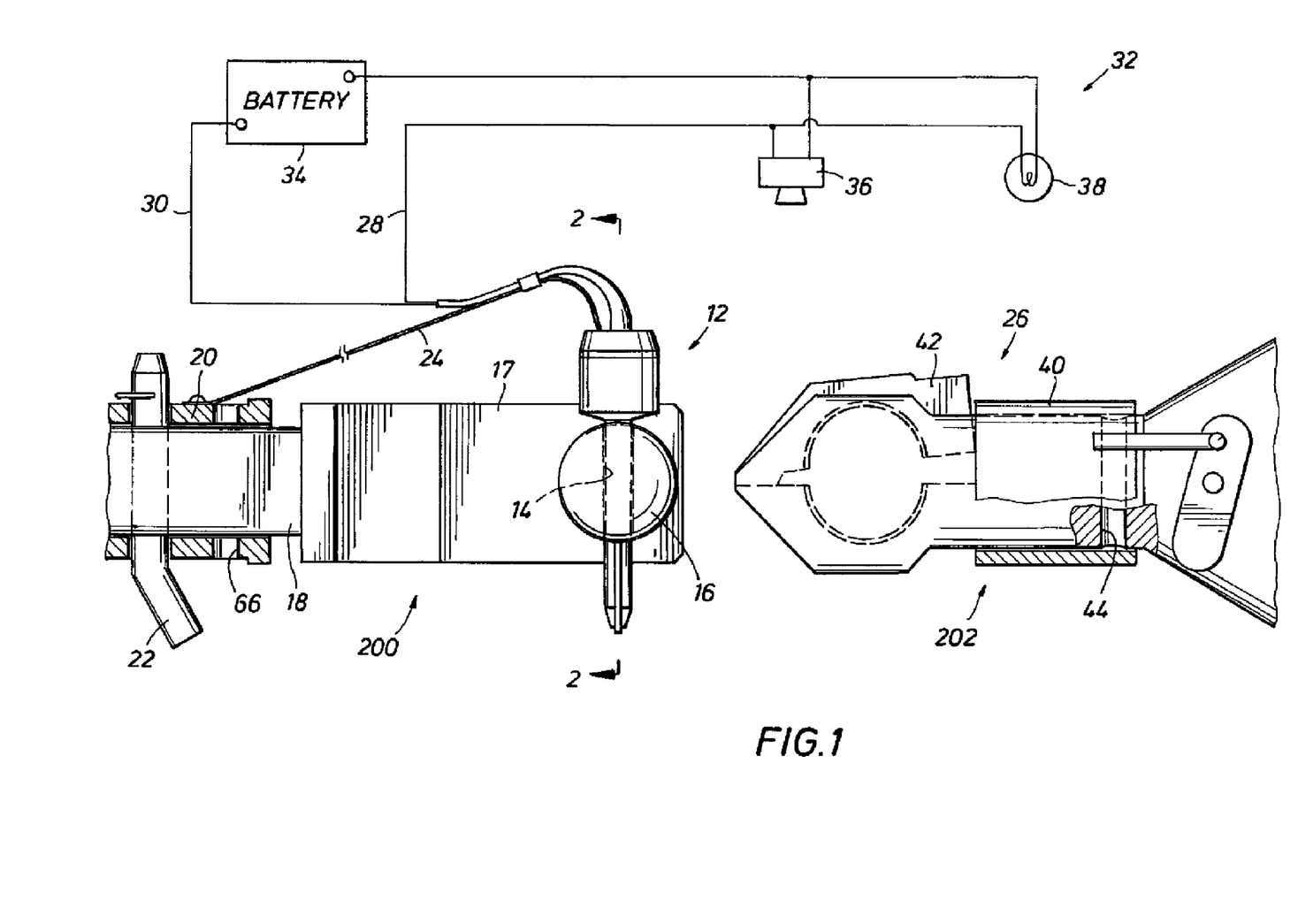
FIG. 1 is a top view of the warning system of this invention, showing a trailer hitch with the safety pin in a stored position and a trailer tongue, ready to be hooked up.

FIG. 1 shows a top down view of a safety trailer hitch system of the present invention wherein a towing vehicle 200 is oriented on the left of FIG. 1 and a towed vehicle 202, such as a trailer, is oriented on the right of FIG. 1. FIG. 1 illustrates the system as the towed vehicle 202 is brought to the towing vehicle 200 for hookup. The system includes a safety pin 12 inserted through a radial hole 14 of a hitch ball 16 which is permanently or temporarily mounted on the towing vehicle 200. Preferably, the hitch ball 16 is removably mounted to a hitch mount 17 which is connected to a receiver tube 18. The receiver tube 18 slides inside a receiver hitch 20, which has become standard equipment on many vehicles now on the market. The receiver tube 18 is preferably secured to the receiver hitch 20 by a shear pin 22.

An electrical cable 24 is mounted to the receiver hitch 20 and the cable 24 is in turn electrically coupled to the safety pin 12. As previously described, pins of the prior art, if such pins are included in a hitch at all, are typically attached to a trailer coupler 26 which extends forward of the towed vehicle 202.

Also coming from the safety pin 12 is a pair of electrical wires 28 and 30, which complete an electric circuit 32 including a battery 34 (preferably the battery of the towing vehicle 200), an audible alarm such as a beeper 36, and a visible alarm such as a warning light 38. The warning beeper 36 and the light 38 are preferably located in the driver's compartment of the towing vehicle 200.

As previously described, FIG. 1 shows the system in its stowed position prior to hookup of the towing and towed vehicles. As the towed vehicle is brought to the towing vehicle for hookup, a locking coupler sleeve 40 is retracted and a ball lock 42 is open. The coupler sleeve 40 in its retracted position covers a pin-receiving hole 44 in the tongue part of the coupler 26. Opening the ball lock 42 permits the trailer coupler 26 to engage the hitch ball 16 in the conventional manner. Also, in order to fit the ball lock over the hitch ball 16, the pin 12 must be withdrawn from the hole 14, as further described below.

Figure 2:
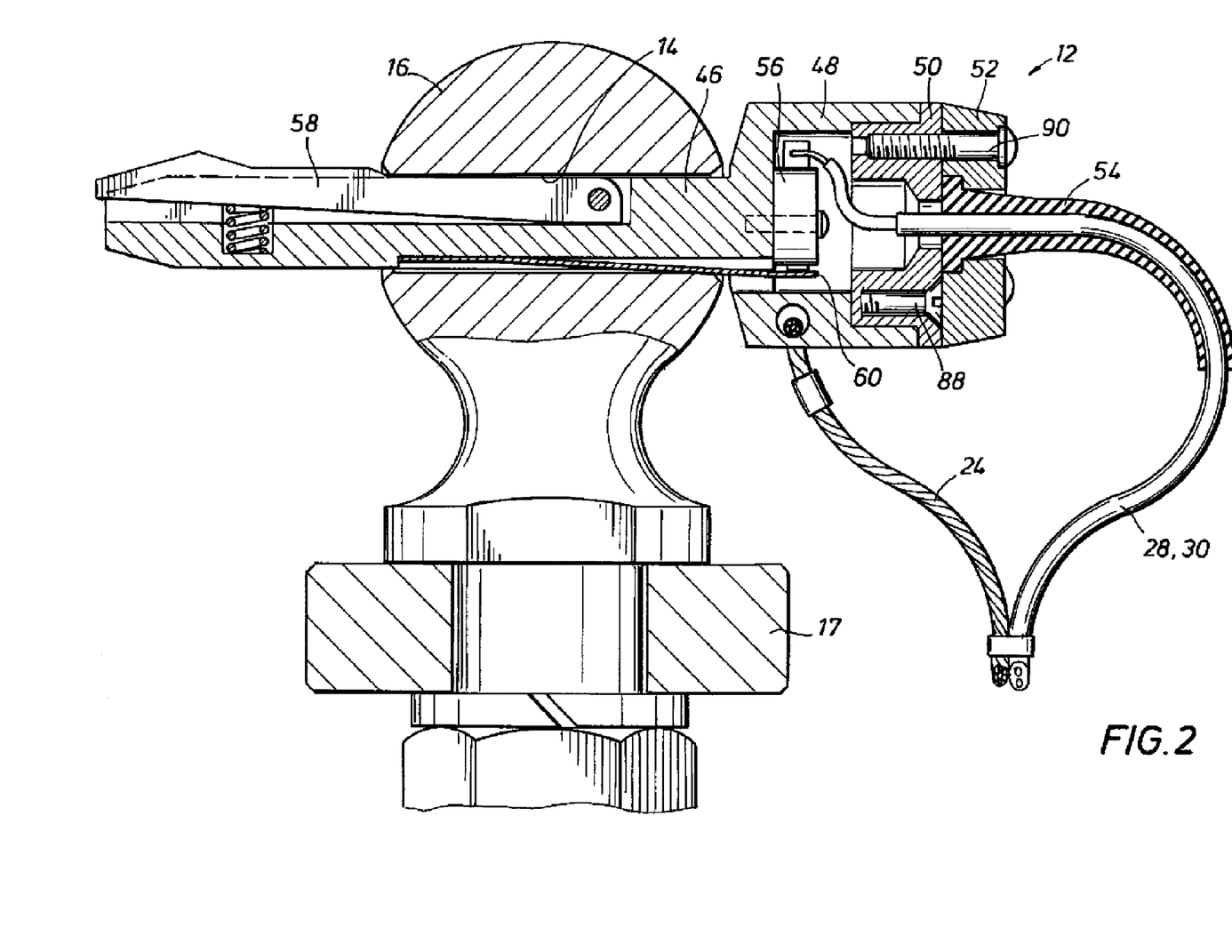
FIG. 2 is an elevation view in cross-section taken along section lines 2—2 as indicated in FIG. 1, showing the pin in a stored position.

Referring now to FIG. 2, the safety pin 12 is shown inserted in the radial hole 14 in the hitch ball 16. The pin 12 consists of a shaft 46 which fits through the radial hole 14 and a hollow head 48 which remains outside of the hole. The head 48 includes a cover plate 50 and a grommet compression ring 52 held onto the cover plate 50 by a plurality of fasteners 90. The head further includes a grommet 54 which seals a microswitch 56 inside the hollow head 48.

The shaft 46 includes a spring-loaded latching arm 58 to securely yet releasably retain the shaft within the radial hole. A leaf spring 60 assists in securely holding the shaft in the hole and also serves as part of the circuit 32 at the microswitch 56.

As previously described, the cable 24 is electrically coupled to the pin 12, and FIG. 2 shows the cable 24 secured to the body 48. The other end of the cable 24 is connected to the receiver hitch 20, as shown in FIG. 1. The wires 28 and 30 run from the micro switch 56 through grommet 54 to circuit 32. The microswitch 56 is normally closed, but its contacts are held in an open position by the contact of leaf spring 60, when the leaf spring is pressed against microswitch 56. This is the case whenever pin 12 is inserted in any properly sized hole, such as the radial hole 14 in the ball 16 or the hole 44 in the tongue 26 or a hole 66 in the receiver hitch 20. The hole 66 is used as a storage location for the pin 12 when the receiver tube 18 with the ball 16 has been removed from the towing vehicle. The pin 12 must be removed from the hole 66 before the receiver tube 18 can be installed into the towing vehicle.

Figure 3:
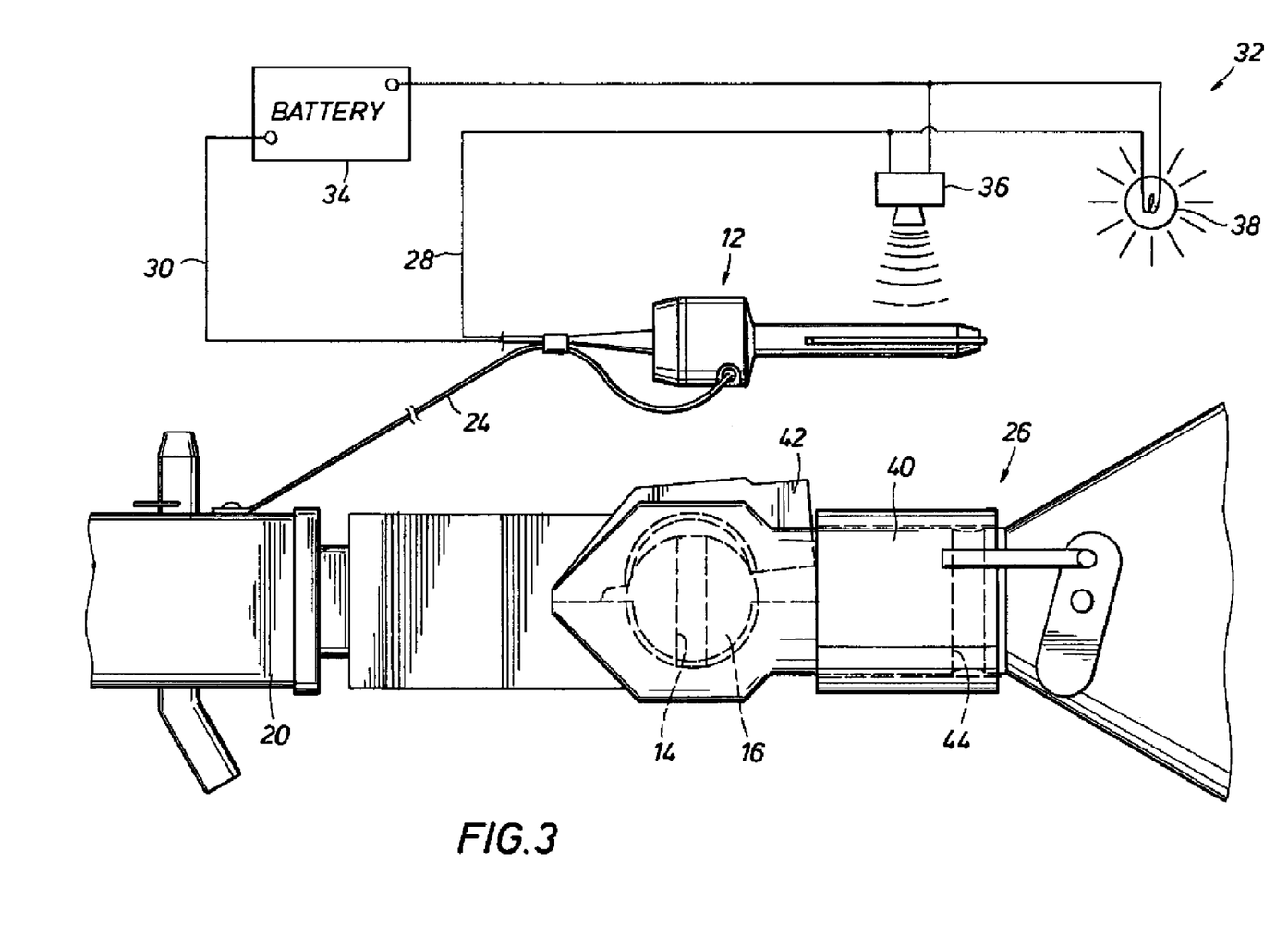
FIG. 3 is a top view of the system, showing the trailer tongue set down on the hitch ball, but the pin not installed and triggering an alarm.

FIG. 3 illustrates the hitch hooked up for towing operations. In FIG. 3, the pin 12 has been pulled out of the hole 14 in the ball 16 and the trailer coupler has been placed over the ball 16. However, the ball lock 42 has not yet been operated and the locking sleeve 40 has not been moved to secure the lock 42. So, the pin 12 can not be placed into the hole 44 and thus the leaf spring 60 of the pin 12 is not depressed. In this condition, the micro switch 56 is in its normally closed position and the circuit 32 is complete. A complete circuit actuates the beeper 36 and the light 38, warning the operator, that the hitching process has not been completed and the safety lock 42 and the sleeve 40 have not been moved into place.

Figure 4:
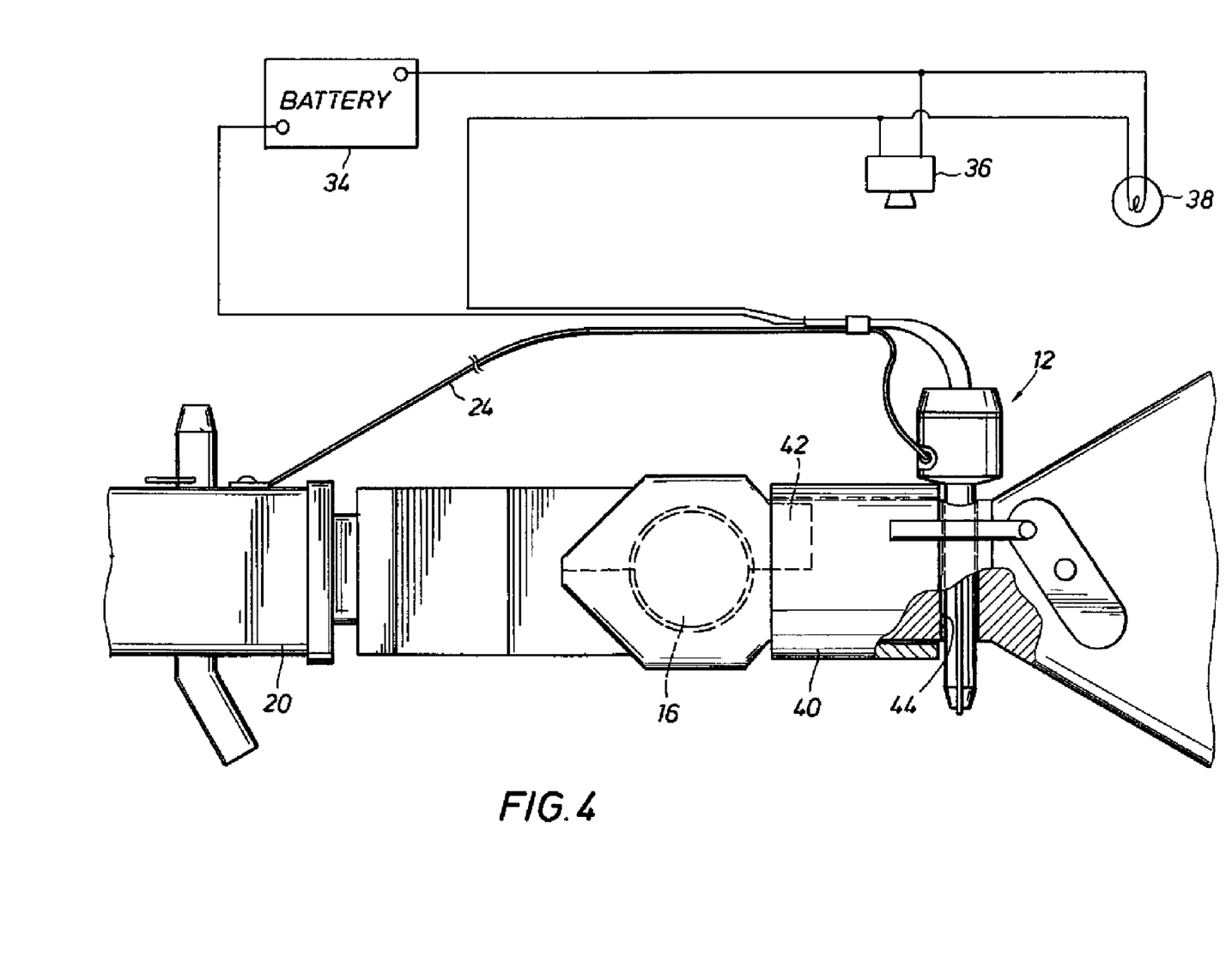
FIG. 4 is a top view of the alarm system, with the coupler locking installed and the alarm disrupted.

FIG. 4 depicts the hitch hooked up and secured so that the audible and visible alarms are deactivated. To attain this condition, the holding lock 42 has been moved into a securing position and the sleeve 40 has been moved forward (toward the towing vehicle), thereby holding the lock 42 in a securing position. By moving the sleeve forward, the hole 44 is exposed, allowing the insertion of the pin 12 into the hole 44. This action depresses the leaf spring 60 of pin 12 (see FIG. 2), putting the microswitch into its normal open position, which silences the alarm.

Figure 5:
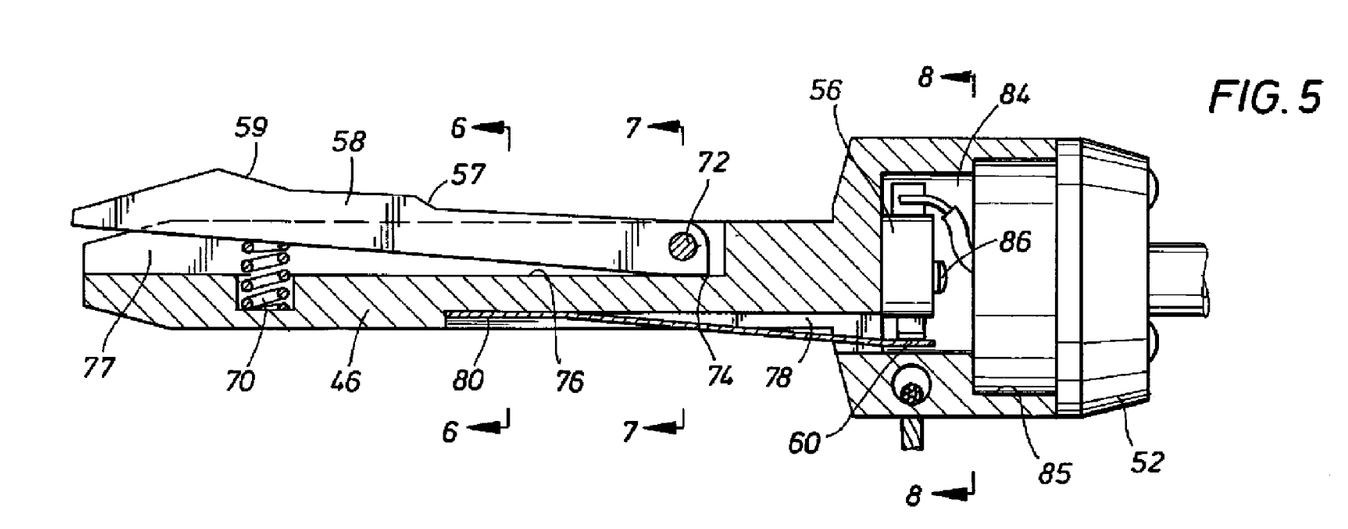
FIG. 5 is a cross-section of the pin not installed and in an alarm triggering position.
Figure 6:
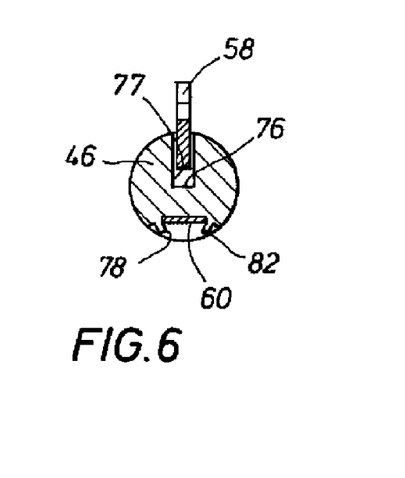
FIG. 6 is a cross-section as indicated in FIG. 5.
Figure 7:
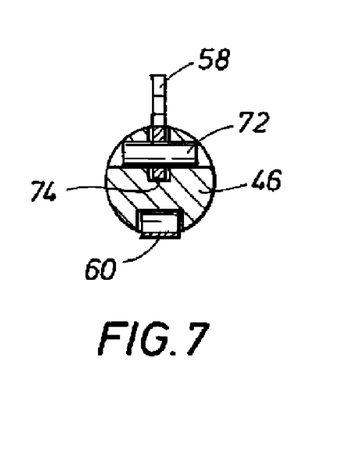
FIG. 7 is a cross-section as indicated in FIG. 5.

FIGS. 5, 6 and 7 show the pin 12 out in the open, i.e. not inserted in any of the sized holes, thus in an alarm triggering condition. FIGS. 6 and 7 show cross sections are section lines 6—6 and 7—7, respectively. The condition of the movable components of the pin 12 should be compared to the condition illustrated in FIG. 2. The spring-loaded latching arm 58, pivoting around a pin 72, is pushed outwardly by a spring 70, but is prevented from moving out too far by a corner 74 touching the bottom 76 of a slot 77. See also FIG. 7. A pair of steps 57 and 59 are located along the upper edge of the arm 58 to provide extra friction against the edges of holes 14, 44, and 66, all of which have different lengths. The leaf spring 60 is located inside a slot 78. Its fixed end 80 is held attached to the shaft 46 by the peened-over edges 82 of slot 78, as shown in FIG. 6.

Figure 8:
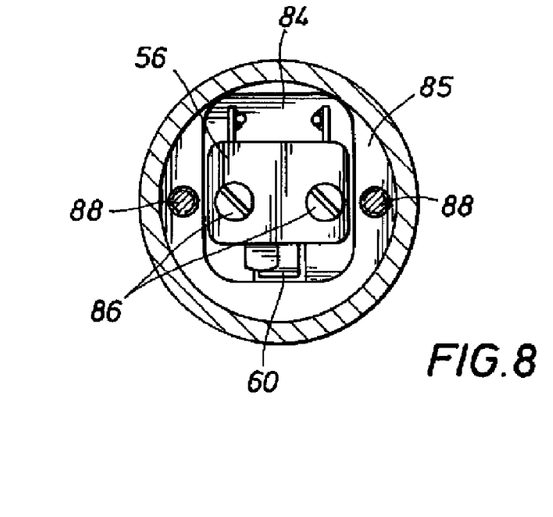
FIG. 8 is a cross-section as indicated in FIG. 5.

FIG. 8 shows a sectional view taken along section lines 8—8 in FIG. 5, illustrating recesses 84 and 85. Recess 84 provides space for the microswitch 56, which is preferably held in place by one or more screws 86. Recess 85 receives cover plate 50 which is held in contact with the bottom of recess 85 by screws 88 (See also FIG. 2). The ring 52, best shown in FIG. 2, is pulled against the plug 50 by the screws 90, compressing the grommet 54 to provide a water tight seal.

Figure 9:
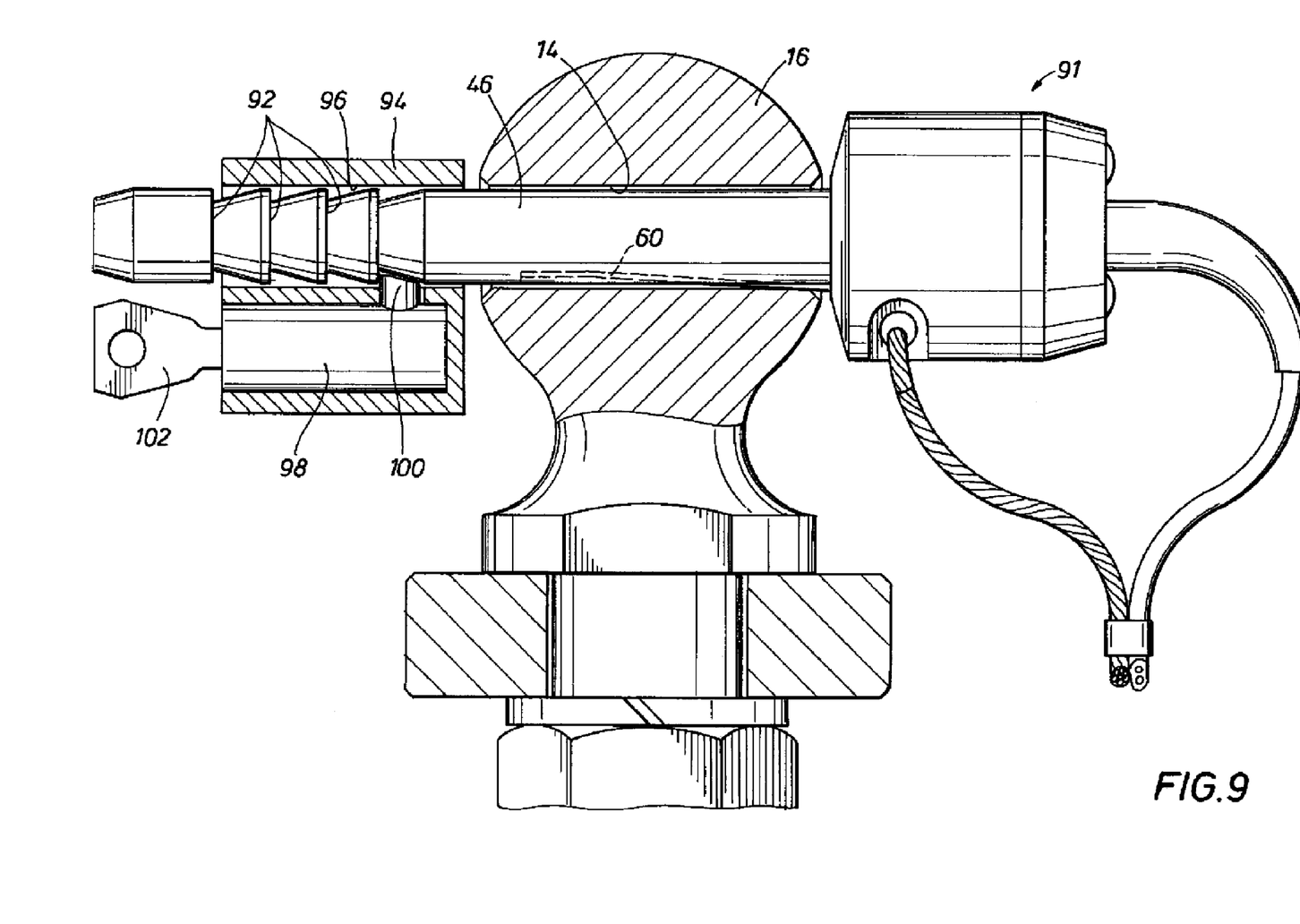
FIG. 9 is another preferred design of the safety pin.

FIG. 9 illustrates another presently preferred embodiment of a pin 91. In the embodiment of FIG. 9, the latching arm 58 of FIG. 2 has been replaced by a series of shoulders 92 on the shaft 46. A block 94 with a hole 96 through it can be slid onto the shaft 46 and over the shoulders 92. A barrel lock 98 with a ratchet tooth 100 is also mounted inside the block 94. The ratchet tooth 100 can be retracted by rotating a key 102, thereby allowing the block 94 to be removed and the pin 91 to be pulled out from ball 16. This locking system serves the additional purpose of preventing a would-be thief from removing the safety pin from hole 44 (see FIG. 4) and unhitching a trailer from the towing vehicle.

Figure 10:
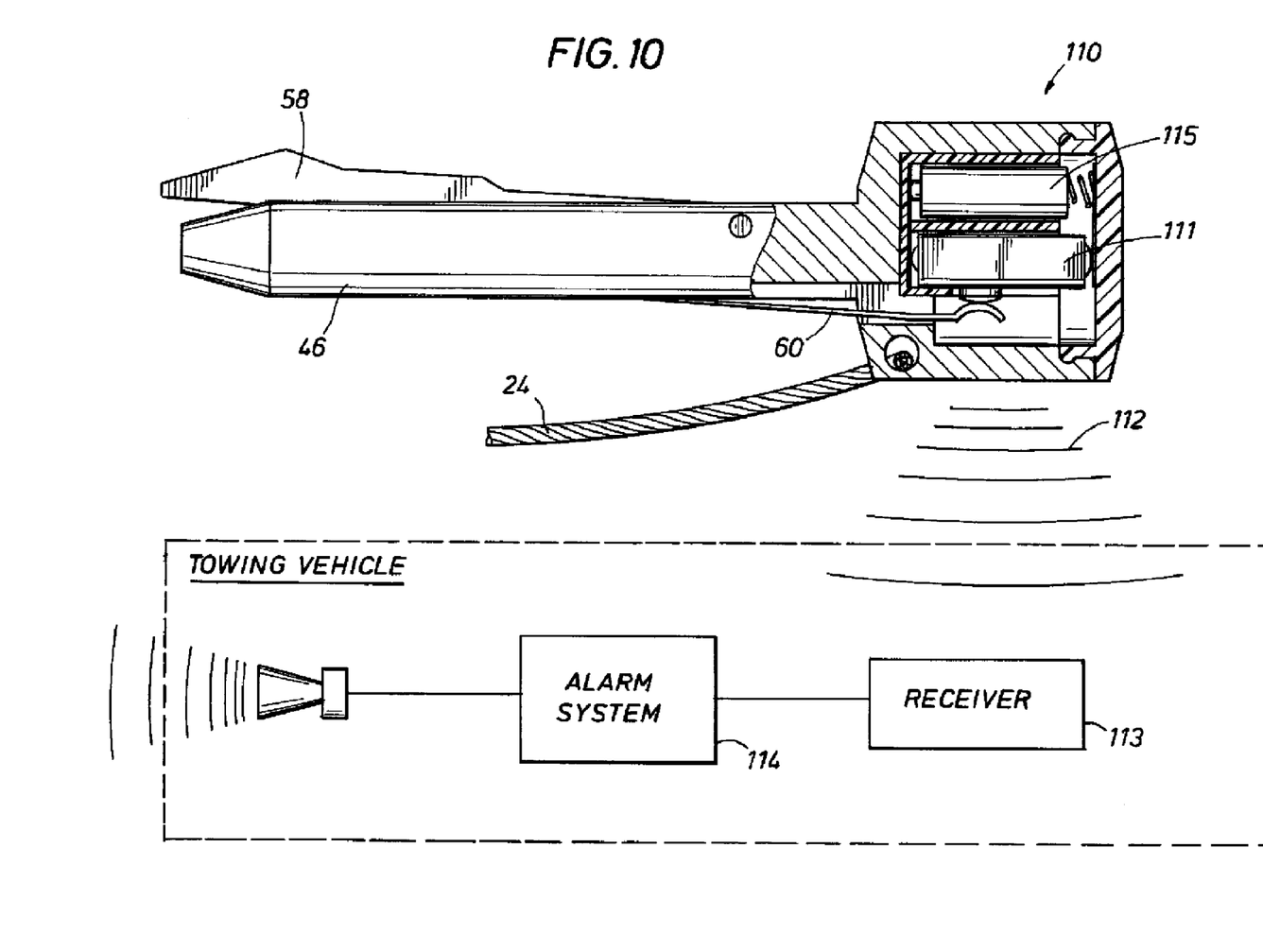
FIG. 10 is another preferred design of the safety pin.

Yet another preferred pin 110 is shown in FIG. 10. In the embodiment of FIG. 10, the leaf spring 60 pushes against a remote control device 111 when the pin 110 is inserted into a hole. Otherwise, remote control 111 sends an electronic signal 112 to the receiver 113 of the towing vehicle's anti-theft alarm system 114, utilizing that already existing system to warn about an unsecured trailer hitch.

The remote control 111 is fed by a battery 115, internal to the pin 110, and electrical wires 28 and 30 are eliminated. The only mechanical connection between the pin and vehicle is the cable 24.

The trailer hitch locking mechanism shown in all these figures is only one version of many being used in the art today. However, the present invention is adaptable to any of the existing hitch locking mechanism by including holes that move into alignment when the lock is closed to allow the insertion of a pin. Typical latching mechanisms known in the art include a pin with a detent ball or a wire spring to prevent that pin from slipping out during travel of vehicle and trailer, without any alarm indication.

The principals, preferred embodiments, and modes of operations of the present invention have been described in detail in the foregoing specification. This invention is not to be construed as limited to the particular forms disclosed, since these are regarded as illustrative rather than restrictive. Moreover, variations and changes may be made by those skilled in the art without departing from the invention.

What is claimed is:

1. A trailer hitch safety system comprising:
   a. a trailer hitch ball with a ball hole therethrough;
   b. a pin sized to fit through the ball hole;
   c. a trailer tongue with a tongue hole therethrough, wherein the pin is adapted to fit through the tongue hole;
   d. a ball lock adapted to lock over the trailer hitch ball; and
   e. an alarm which alarms when the ball lock is not properly locked over the trailer hitch ball.

2. The system of claim 1, further comprising a locking coupler sleeve having a first position obscuring the tongue hole and a second position exposing the tongue hole.

3. The system of claim 1, wherein the pin comprises a shaft and a head.

4. The system of claim 3, wherein the shaft includes a spring-loaded latching arm defining a plurality of steps, enabling a secure fit for the pin in more than one length of hole.

5. The system of claim 3, wherein the head defines a hollow interior.

6. The system of claim 5, wherein the interior of the head contains a microswitch.

7. The system of claim 6, further comprising a leaf spring along the shaft extending into the interior of the head to actuate the microswitch.

8. The system of claim 1, wherein the alarm includes at least one of an audible alarm and a visible alarm.

9. The system of claim 3, wherein the shaft defines a shoulder and further comprising a block which mates with the shoulder.

10. The system of claim 9, further comprising a ratchet in the block to mate with the shoulder.

11. The system of claim 5, further comprising a battery powered remote control device in the interior of the head.

12. The system of claim 11, wherein the remote control device controls an anti-theft system of the towing vehicle.

* * * * *